US011905805B2

(12) United States Patent
Joshi et al.

(10) Patent No.: US 11,905,805 B2
(45) Date of Patent: Feb. 20, 2024

(54) LOW EMISSIONS WELL PAD WITH INTEGRATED ENHANCED OIL RECOVERY

(71) Applicant: Baker Hughes Oilfield Operations LLC, Houston, TX (US)

(72) Inventors: Mahendra Joshi, Katy, TX (US); Alireza Shahkarami, Oklahoma City, OK (US); Rob Klenner, Oklahoma City, OK (US)

(73) Assignee: Baker Hughes Oilfield, Houston, TX (US)

( * ) Notice: Subject to any disclaimer, the term of this patent is extended or adjusted under 35 U.S.C. 154(b) by 40 days.

(21) Appl. No.: 17/525,901

(22) Filed: Nov. 13, 2021

(65) Prior Publication Data
US 2022/0154564 A1 May 19, 2022

Related U.S. Application Data

(60) Provisional application No. 63/113,754, filed on Nov. 13, 2020.

(51) Int. Cl.
*E21B 43/16* (2006.01)
*E21B 41/00* (2006.01)
(Continued)

(52) U.S. Cl.
CPC ............ *E21B 43/168* (2013.01); *E21B 33/12* (2013.01); *E21B 41/0085* (2013.01);
(Continued)

(58) Field of Classification Search
CPC .......... E21B 43/26; E21B 34/10; E21B 34/14; E21B 2200/06; E21B 43/16; E21B 43/168; E21B 43/122; E21B 34/06
See application file for complete search history.

(56) References Cited

U.S. PATENT DOCUMENTS

| 3,638,724 A | 2/1972 | Salerni |
| 3,827,243 A | 8/1974 | Paull et al. |

(Continued)

FOREIGN PATENT DOCUMENTS

| CN | 201908632 U | 7/2011 |
| WO | 2016057780 A1 | 4/2016 |
| WO | 2016193700 A1 | 12/2016 |

OTHER PUBLICATIONS

Translation of CN 100347403. (Year: 2007).*
(Continued)

*Primary Examiner* — Zakiya W Bates
(74) *Attorney, Agent, or Firm* — Crowe & Dunlevy, P.C.

(57) ABSTRACT

Systems and methods involve capturing gaseous and liquid byproducts from the recovery of hydrocarbons and then using those captured byproducts for commercially and environmentally advantageous purposes. A method for recovering hydrocarbons from a well includes the steps of placing the well in a first mode of operation in which gases from the well are stored under pressure in a gas storage unit on the surface, and placing the well in a second mode of operation in which gases are transferred from the gas storage unit into an underground gas storage formation through the well. Methods for managing produced water include the steps of storing the produced water in an underground water storage reservoir, heating the produced water with geothermal energy, and transferring the heated water to an energy recovery system to generate electricity from the heated produced water.

16 Claims, 5 Drawing Sheets

(51) Int. Cl.
| | |
|---|---|
| *E21B 43/12* | (2006.01) |
| *H02K 7/18* | (2006.01) |
| *F03G 4/00* | (2006.01) |
| *E21B 33/12* | (2006.01) |
| *E21B 43/40* | (2006.01) |
| *E21B 43/26* | (2006.01) |

(52) U.S. Cl.
CPC .......... *E21B 43/122* (2013.01); *E21B 43/123* (2013.01); *E21B 43/26* (2013.01); *E21B 43/40* (2013.01); *F03G 4/00* (2021.08); *H02K 7/1823* (2013.01)

(56) References Cited

U.S. PATENT DOCUMENTS

| | | |
|---|---|---|
| 7,147,059 B2 | 12/2006 | Hirsch et al. |
| 7,464,763 B2 | 12/2008 | Galloway et al. |
| 2009/0266554 A1 | 10/2009 | Wilson et al. |
| 2010/0258316 A1 | 10/2010 | Lockhart et al. |
| 2012/0138316 A1 | 6/2012 | Matzakos |
| 2014/0360719 A1 | 12/2014 | Farajzadeh et al. |
| 2020/0217180 A1 | 7/2020 | Leniek, Sr. |
| 2020/0347707 A1 | 11/2020 | Bowdon et al. |

OTHER PUBLICATIONS

Translation of CN 104879167. (Year: 2015).*
ISA/US; Search Report and Written Opinion for PCT/US2021/059283 dated Mar. 25, 2022.
"Geothermal Electricity Production Basics", Geothermal Electricity Production Basics; NREL Transforming Energy (No Date).
Von Flatern, Rick , "Introduction to Well Completions", Oilfield Review; The Defining Series: Introduction to Well Completions, Jan. 9, 2015.

* cited by examiner

FIG. 5 ized gases in a gas storage unit, transferring the pressurized gases from the gas storage unit to the second well, and injecting the pressurized gases into the common geologic formation from the second well to sweep hydrocarbon fluids into the first well through the fractures in the common geologic formation.

LOW EMISSIONS WELL PAD WITH INTEGRATED ENHANCED OIL RECOVERY

RELATED APPLICATIONS

The present application claims the benefit of U.S. Provisional Patent Application Ser. No. 63/113,754 filed Nov. 13, 2020 entitled, "Low Emissions Well Pad with Integrated Enhanced Oil Recovery," the disclosure of which is herein incorporated by reference.

FIELD OF THE INVENTION

This invention relates generally to the field of oil and gas production, and more particularly to an improved apparatus and method for recovering hydrocarbons from subterranean formations.

BACKGROUND

The oil and gas industry is under increasing pressure to reduce greenhouse gas emissions and improve environmental sustainability. Past practices of flaring waste gas during the drilling and production phases must be discontinued or minimized to reduce the release of natural gas into the atmosphere. Some oil and gas companies have already set targets to become "carbon neutral" by 2050.

In addition to the environmental risks presented by fugitive gases released at the well site, many fields also produce a significant volume of brine in connection with the recovery of liquid petroleum products. The produced water must be transferred a long distance for reinjection in saltwater disposal wells. In certain locations, the injection of produced water has been linked to increased and undesirable seismic activity. The management of waste water presents therefore presents environmental and economic challenges.

There is, therefore, a need to an economically viable process for recovering hydrocarbons that reduces the release of methane and other greenhouse gases, while minimizing the transportation and offsite reinjection of produced water. It is to these and other deficiencies in the prior art that embodiments of the present invention are directed.

SUMMARY OF THE INVENTION

Embodiments disclosed herein are generally directed at systems and methods for capturing gaseous and liquid byproducts from the recovery of hydrocarbons and using those byproducts for commercially and environmentally advantageous purposes. In one aspect, the present disclosure is directed to a method for recovering hydrocarbons from a producing formation to surface facilities through a well. The method includes the steps of placing the well in a first mode of operation in which gases from the well are stored under pressure in a gas storage unit on the surface, and placing the well in a second mode of operation in which gases are transferred from the gas storage unit into an underground gas storage formation through the well.

In another aspect, the present disclosure is directed to a method for managing produced water that accumulates as a byproduct from a process for recovering hydrocarbons from a producing formation through a well. The method includes the steps of separating the produced water from the hydrocarbons recovered from the well, emplacing the produced water into an underground water storage reservoir where the temperature of the produced water is increased by geothermal heat, transferring the heated produced water from the underground water storage reservoir to an energy recovery system, and using the energy recovery system to generate electricity from the heated produced water.

In yet another aspect, the present disclosure is directed to a method for enhancing the production of hydrocarbon fluids from one or more wells within a well complex that includes a first well and a second well connected by fractures in a common geologic formation. The method includes the steps of capturing gases produced from a third well, pressurizing the gases captured from the third well, storing the pressurized gases in a gas storage unit, transferring the pressurized gases from the gas storage unit to the second well, and injecting the pressurized gases into the common geologic formation from the second well to sweep hydrocarbon fluids into the first well through the fractures in the common geologic formation.

WRITTEN DESCRIPTION

As used herein, the term "petroleum" refers broadly to all mineral hydrocarbons, such as crude oil, natural gas and combinations of oil and gas. The term "fluid" refers generally to both gases and liquids, and "two-phase" or "multiphase" refers to a fluid that includes a mixture of gases and liquids. "Upstream" and "downstream" can be used as positional references based on the movement of a stream of fluids from an upstream position in the wellbore to a downstream position on the surface.

Figure 1:
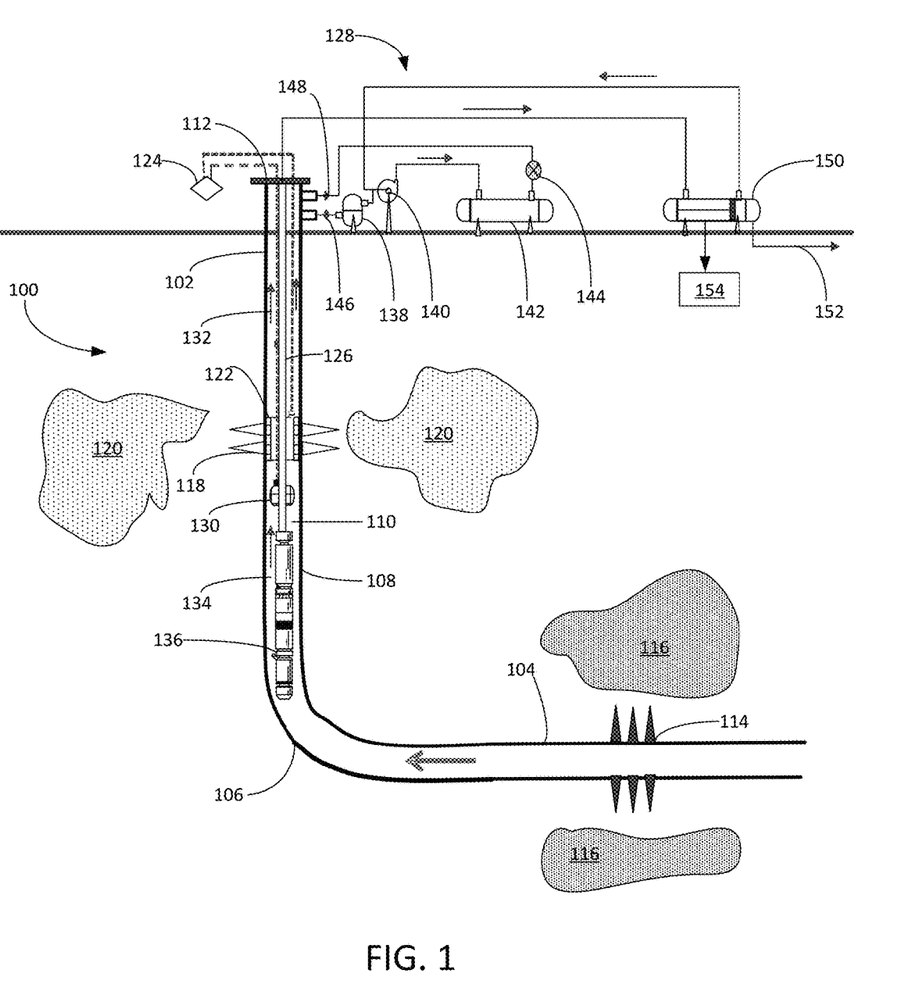
FIG. 1 depicts an oil and gas well constructed in accordance with an exemplary embodiment of the invention in a first mode of operation.

Turning to FIG. 1, shown therein is a depiction of a well 100 constructed in accordance with an exemplary embodiment. The well 100 is drilled for the production of petroleum products, including crude oil and natural gas. The well 100 includes a vertical portion 102, a lateral portion 104 and a heel 106 that connects the vertical portion 102 and the lateral portion 104. The well 100 optionally includes a casing 108 that extends through at least a portion of the vertical portion 102, heel 106 and lateral portion 104. The casing 108 defines a well interior 110 that extends to a wellhead 112 located on the surface.

The well 100 includes lower perforations 114 that place the well interior 110 in communication with a hydrocarbon producing formation 116. The well 100 also includes upper perforations 118 that place the well interior 110 in communication with a gas storage formation 120. The lower perforations 114 and upper perforations 118 both extend through the casing 108 to allow the transmission of fluids between the well 100 and the adjacent geologic formation. The well 100 further includes a sliding sleeve 122 that can be manipulated to open and close the upper perforations 118. The sliding sleeve 122 can be hydraulic, pneumatic, electric, or mechanical and adjusted in response to a controller 124 located on the surface.

The well 100 includes production tubing 126 that is configured to carry fluids from the well interior 110 through the wellhead 112 to surface facilities 128. The well 100 includes a zone isolation device or "packer" 130 disposed around the production tubing 126. Using the controller 124, the packer 130 can be selectively deployed to seal the well interior 110 between the production tubing 126 and the well casing 108. When the packer 130 is deployed, the well interior 110 is separated into an upper zone 132 and a lower zone 134. When the packer 130 is retracted (as depicted in FIG. 1), the well interior 110 is not separated and fluids may pass through the annular well interior 110 around the packer 130, or through the inside of the production tubing 126.

Figure 2:
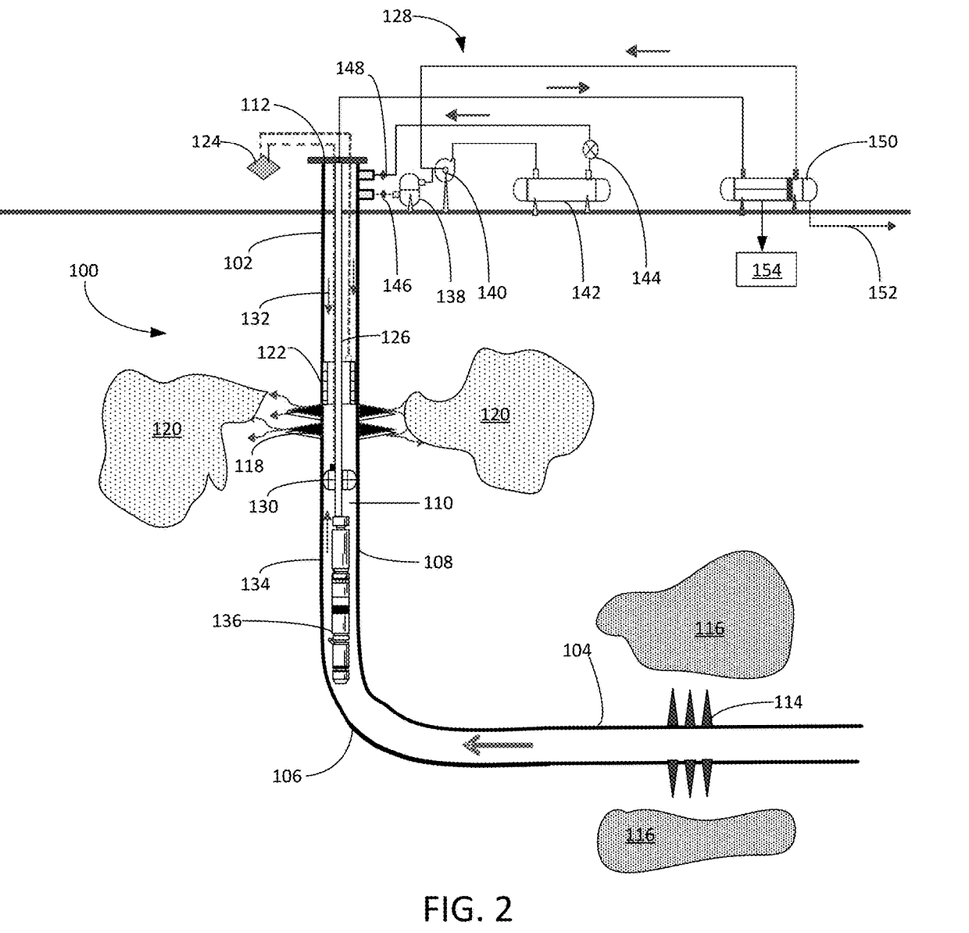
FIG. 2 depicts the oil and gas well of FIG. 1 in a second mode of operation.
Figure 3:
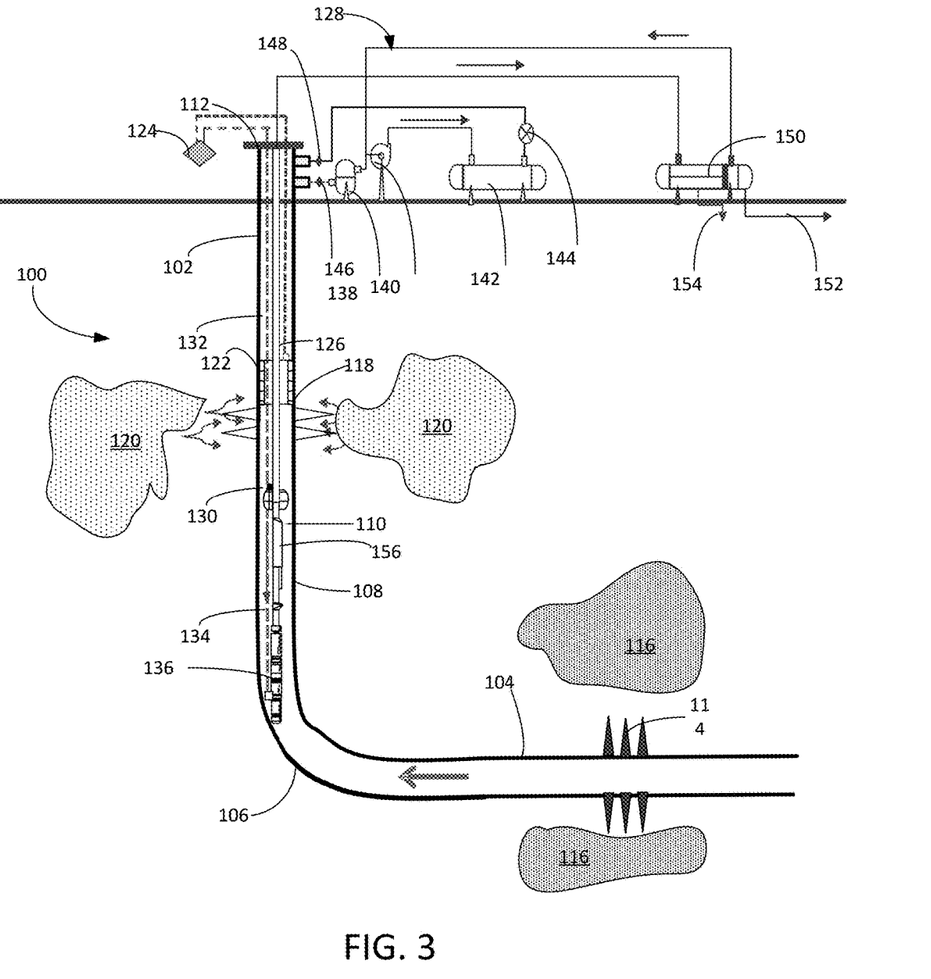
FIG. 3 depicts the oil and gas well of FIG. 1 in a third mode of operation.

The well 100 optionally includes an artificial lift device 136 that can be activated to urge fluids from the lower zone 134 to the surface through the production tubing 126. In some embodiments, the artificial lift device 136 is an electric submersible pump (as depicted in FIGS. 1-2). The use of an electric submersible pump is often prescribed when there is a relatively large volume of fluids produced by the hydrocarbon producing formation 116. As the production curve for the well 100 declines, the artificial lift device 136 can be switched from a high-volume electric submersible pump to a lower-volume gas lift system (as depicted in FIG. 3). In other embodiments, rod lift and other artificial lift systems can be used to force fluids from the hydrocarbon producing formation 116 to the surface.

The surface facilities 128 include some combination of a dehydrator unit 138, a compressor 140, a gas storage unit 142, and a gas isolation valve 144. The surface facilities 128 also include a gas removal valve 146 between the wellhead 112 and the dehydrator unit 138, and a gas injection valve 148 between the gas storage unit 142 and the wellhead 112. The gas removal valve 146 and gas injection valve 148 are configured to control the movement of gases between the annular space within the well interior 110 and the surface facilities 128. Gas lines, pipes and hoses are configured to connect the dehydrator unit 138, compressor 140, gas storage unit 142 and wellhead 112.

The surface facilities also 128 also include a fluid separator 150 connected to the wellhead 112. The fluid separator 150 is configured to process and separate multiphase fluids produced through the production tubing 102. In most embodiments, the fluid separator 150 is configured to separate gaseous hydrocarbons, liquid hydrocarbons and water-based fluids. The liquid hydrocarbons can be directed to a sales line 152. The gaseous hydrocarbons can provided to the intake line to the compressor 140. The water-based fluids can be sent to a produced water management system 154.

Although a single well 100 is depicted in FIGS. 1-3, it will be appreciated that the well 100 can be part of a larger complex of wells arranged in any number of configurations. In embodiments that include multiple wells 100, it will be appreciated that common surface facilities 128 can be configured to manage the production of hydrocarbons from multiple wells 100. In each variation, the well 100 is configured to provide a solution for recovering hydrocarbons that is both economically attractive and environmentally sustainable. As used herein, the term "low emissions well pad system 200" refers to the collection of equipment and processes that control the flow of gases and liquids from the producing formation 116. In some embodiments, the low emissions well pad system 200 includes the packer 130, the sliding sleeve 122, the gas removal valve 146 and the gas injection valve 148. In other embodiments, the low emissions well pad system 200 also includes elements from the surface facilities 128.

As depicted in the embodiments of FIGS. 1-3, the low emissions well pad system 200 provides a system and method for minimizing or eliminating the flaring or release of gaseous hydrocarbons from the primary well 100. The well 100 is optimally established in a location that includes access to an upper geologic formation that has sufficient porosity to serve as the gas storage formation 120. The gas storage formation 120 can be located at a relatively shallow depth (e.g., 2,000 to 3,000 feet). In some embodiments, an aquifer can be used as the gas storage formation 120, particularly if the aquifer includes an impermeable cap rock. The hydrocarbon producing formation 116 is positioned below the gas storage formation 120, and may be located nearer the lateral portion 104 of the well 100 (as depicted in FIGS. 1-3).

FIG. 1 depicts a first mode of operation for the low emissions well pad system 200 in which the sliding sleeve 122 is deployed to close the upper perforations 118 to prevent the movement of fluids between the well interior 110 and the gas storage formation 120. The packer 130 is collapsed or retracted to permit the movement of fluids in the annular space between the casing 108 and the production tubing 126. In this mode of operation, hydrocarbon fluids from the hydrocarbon producing formation 116 are carried into the well interior 110, where hydrocarbons are either produced to the surface through the production tubing 126 or through the well interior 110.

Gases rising through the well interior 110 are carried from the wellhead 112 to the dehydrator unit 138 through the open gas removal valve 146. The dehydrator unit 138 removes some moisture content from the gas. The dry gas is then fed to the compressor 140, which forces the gas under pressure into the surface-based gas storage unit 142. The gas may be compressed to a pressure of between about 1,000 and 3,000 psig. The pressurized gas is trapped in the gas storage unit 142 by the closed gas isolation valve 144.

Hydrocarbon fluids produced through the production tubing 126 are carried from the wellhead 112 to the fluid separator 150, where liquid petroleum products are diverted to the sales line 152 and gaseous hydrocarbons are diverted back to the intake to the compressor 140, for compression and storage within the gas storage unit 142. Water-based fluids are directed to the produced water management system 154. The operation of the well 100 in this first mode of operation can be carried out until the gas storage unit 142 is at capacity, or if there are other reasons to switch to the second mode of operation.

When the low emissions well pad system 200 is switched to the second mode of operation (as depicted in FIG. 2), the gas removal valve 146 is closed, the sliding sleeve 122 is retracted to reveal the upper perforations 118, and the packer 130 is expanded or deployed. The gas injection valve 148 and the gas isolation valve 144 are then opened to permit the pressurized gas stored within the gas storage unit 142 to flow back into the well 100, through the open upper perforations 118, and into the porous gas storage formation 120.

In certain situations, it may be helpful to use the compressor 140 to chase the hydrocarbon gas released from the surface-based gas storage unit 142 with ambient air, carbon dioxide, or nitrogen, or another inert gas to ensure that the gaseous hydrocarbons are fully emplaced within the gas storage formation 120. Once the gaseous hydrocarbons have been sufficiently stored within the underground gas storage formation 120, the sliding sleeve 122 can be deployed to prevent the movement of fluids between the upper perforations 118 and the well interior 110. The placement of hydrocarbon gases within the gas storage formation 120 provides substantial environmental advantages over the existing practice of flaring or discharging the greenhouse gases to the atmosphere.

The well 100 can be cycled between the first and second modes of operation indefinitely or until the gas storage formation 120 reaches its capacity. In many cases, the capacity of the gas storage formation 120 should not act as the limiting factor for the number of times the well 100 can be cycled through the first and second modes of operation. In some embodiments, the well 100 is operated in the first mode of operation for between about 1 to 12 hours, before switching to the second mode of operation for the longer-term storage of the gaseous hydrocarbons.

At some point during the lifecycle of the well 100, it may be beneficial to incorporate a gas lift system 156 to aid in the removal of liquid hydrocarbons or water from the well 100 in a third mode of operation, as depicted in FIG. 3. The gas lift system 156 may be used alone or in conjunction with the electric submersible pump or other artificial lift device 136. The gas lift system 156 functions in accordance with well-established principles in which one or more side pocket gas lift modules are connected to permit pressurized gas within the well interior 110 to enter the production tubing 126 through one-way gas lift valves to reduce the density of fluids within the production tubing 126.

When the low emissions well pad system 200 is placed into the third mode of operation as depicted in FIG. 3, the gas removal valve 146 is closed, the packer 130 is opened and the sliding sleeve 122 is moved into an open position. This permits gases stored within the gas storage formation 120 to move through the upper perforations 118 into the well interior 110. The pressure between the gas storage formation 120 and the well interior 110 will eventually equalize at a pressure that is sufficient to operate the gas lift system 156. The gases enter the production tubing 126 through the gas lift system 156 and are carried to the fluid separator 150. The gases are then separated from the liquid products and directed to the compressor 140 and stored under pressure in the surface-based gas storage unit 142. The well 100 can operate in this third mode of operation until the pressure within the well interior is insufficient to operate the gas lift system 156, or a sufficient volume of liquid has been unloaded from the well 100 with the gas lift system 156. At that time, the well 100 can be switched back to the alternating first and second modes of operation to refill the gas storage formation 120.

In some embodiments, the well 100 is switched between the first, second and third modes of operation in response to an optimization strategy deployed through the controller 124. Using machine learning and adaptive algorithms, the controller 124 can be configured to automatically cycle the well 100 through the various operational modes to achieve a desired outcome. For example, the controller 124 can be configured to optimize the time the well 100 spends in each of the various modes of operation to maximize the production of hydrocarbons from the well 100 by ensuring that sufficient gas is stored in the gas storage formation 120 to operate the gas lift system 156. As another example, the controller 124 can be configured to switch between the various modes of operation to minimize water production or minimize the amount of methane or other hydrocarbon gases that would otherwise be flared. Thus, the low emissions well pad system 200 provides the ability to optimize the performance of the well 100 by configuring the controller 124 to automatically optimize the state and operation of the well 100 to achieve a designated outcome.

Figure 4:
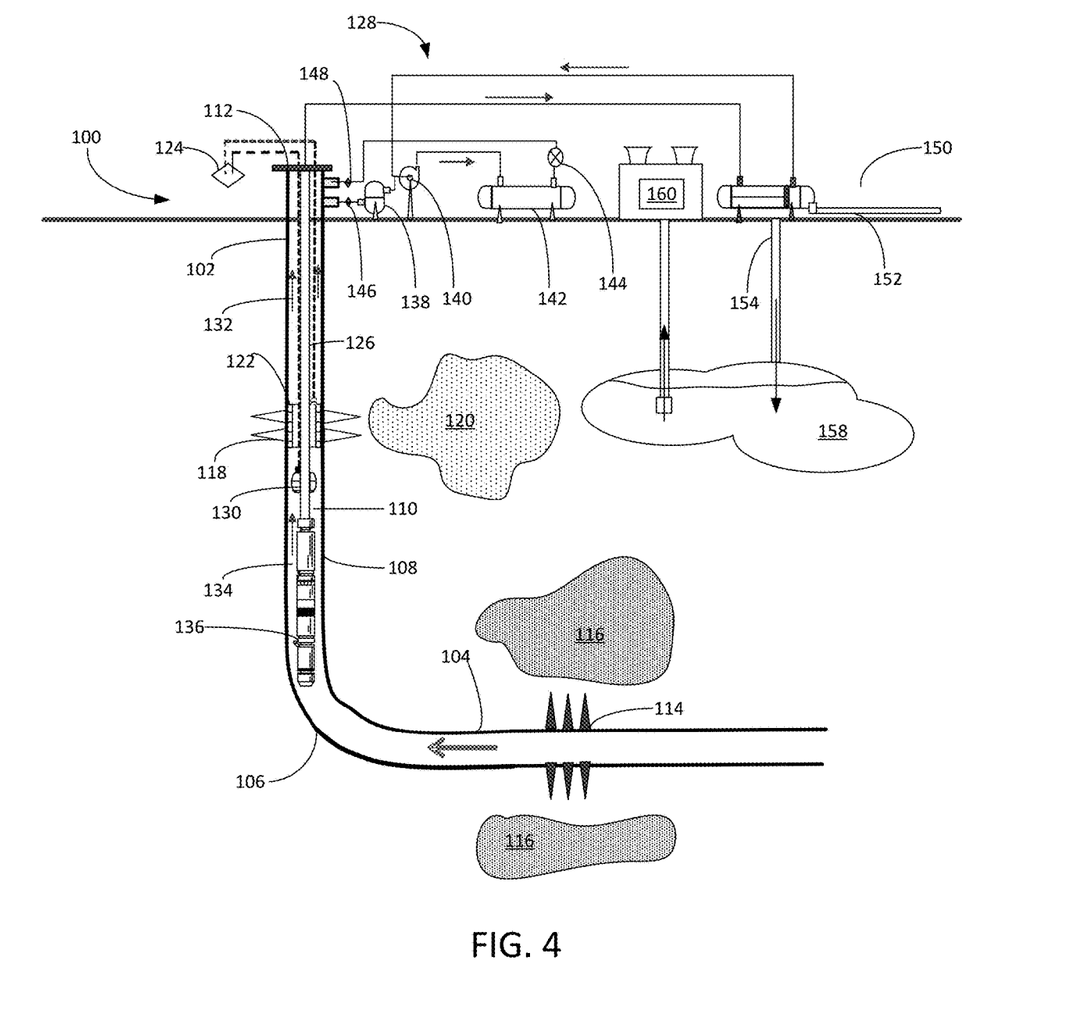
FIG. 4 depicts an enhanced process for managing produced water for generating power.

Turning to FIG. 4, shown therein is an illustration of an exemplary embodiment of the low emissions well pad system 200 that incorporates the produced water management system 154. The produced water from the well 100 can be injected into an underground water storage reservoir 158, which may be a saline aquifer. The produced water management system 154 injects produced water into the water storage reservoir 158, where it is naturally heated by the internal temperature of the formation. The heated water can then be pumped or otherwise moved to the surface, where it is processed through an energy recovery system 160.

In exemplary embodiments, the energy recovery system 160 follows the organic Rankine cycle in which the geothermal energy from the heated water is transferred to a working fluid through a heat exchanger. The working fluid is selected for its ability to expand in response to heating, so that they expanding fluid can be used to drive a turbine. The turbine can be used to drive an electricity generator, which can be used to offset some or all of the electrical power requirements of the well 100. Thus, rather than hauling produced water away from the well 100 for disposal at a remote injection site, the produced water management system 154 places the water into the underground water storage reservoir 158, where it can be heated and then used to safely produce electrical power at the surface through the energy recovery system 160. Thus, in the embodiment depicted in FIG. 5, the low emissions well pad system 200 also includes the produced water management system 154 and the energy recovery system 160.

Figure 5:
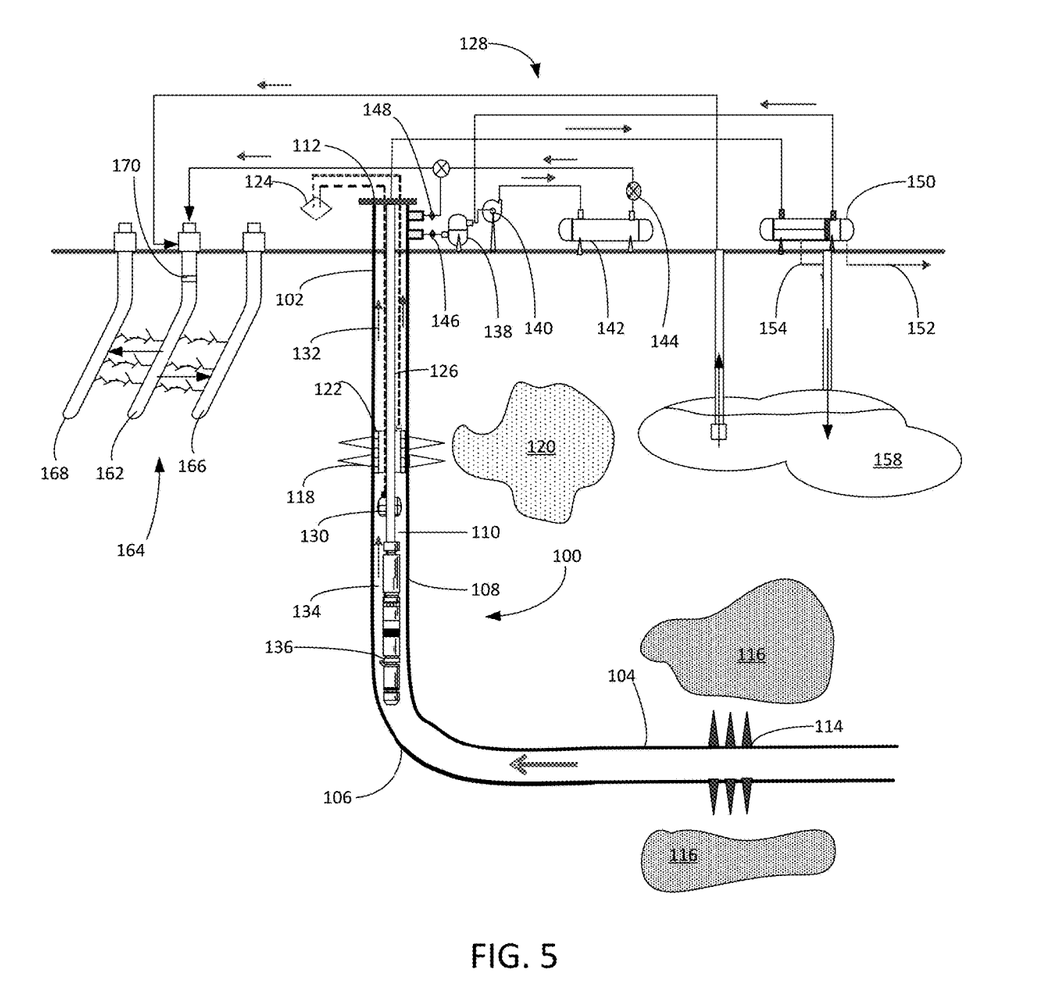
FIG. 5 depicts a process for performing enhanced oil recovery (EOR) on secondary wells using gases and produced water captured at the primary well.

Turning to FIG. 5, shown therein is an additional application for the low emissions well pad system 200. In one mode of enhanced oil recovery (EOR) operation, the pressurized gas stored within the gas storage formation 120 is used to stimulate the well 100 through a "huff and puff" operation. In this mode of operation, the pressurized gas in the gas storage formation 120 can be directed through the upper perforations 118 or lower perforations 114 to sweep hydrocarbons into a separate well complex 164. Alternatively, the pressured gas within the gas storage formation 120 can be gathered and compressed using the surface facilities 128 and then injected into the well complex 164 through an infill well 162 in accordance with established injection recovery principles.

In another mode of operation, the low emissions well pad system 200 provides a source of pressurized gases and liquids that can be used to stimulate or one or more wells within the well complex 164 through a gas-based enhanced oil recovery (EOR) process, e.g., huff-and-puff, to improve hydrocarbon production during the initial production phase. In this mode of operation, pressurized gas is diverted from the gas storage unit 142 at the well 100 (the "first well") directly into the infill well 162 (the "second well"), which communicates the pressurized gas through hydraulic fractures and natural fractures to sweep liquids to parent wells 166 and child wells 168 ("third wells").

As depicted in FIG. 5, gas stored in the gas storage formation 120 from the well 100 can be used to for cyclic gas injection in the infill well 162. The gas injection through the infill well 162 can be followed by high pressure water injection to push the gas through the well complex 164. The high pressure water can be sourced from the produced water management system 154 in the first well 100. A dissolvable frac plug 170 can be used as a barrier between the gas and liquid barrier in the second, infill well 162. The dissolvable frac plug 170 acts as a piston to enable an incompressible water column to push the compressible gas column in the infill well 162 and then into the well complex 164. This method allows using high pressure water to create the high pressure compression and injection of gas without requiring a large gas compressor on the surface.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method for recovering hydrocarbons from a producing formation to surface facilities through a well, the method comprising the steps of:
   placing the well in a first mode of operation in which gases from the well are stored under pressure in a gas storage unit on the surface;
   placing the well in a second mode of operation in which gases are transferred from the gas storage unit into an underground gas storage formation through the well where the gases are stored in the underground gas storage formation and prevented from reentering the well; and
   returning the well to the first mode of operation while the gases remain stored in the underground gas storage formation.

2. The method of claim 1, wherein the step of placing the well in the first mode of operation comprises placing a sliding sleeve in a closed position to prevent communication of fluids between the well and the underground gas storage formation through upper perforations.

3. The method of claim 2, wherein the step of placing the well in the first mode of operation further comprises the step of closing a gas isolation valve between the gas storage unit and the well.

4. The method of claim 2, wherein the step of placing the well in the first mode of operation further comprises the step of increasing the pressure of the gases from the well with a compressor.

5. The method of claim 2, wherein the step of placing the well in the first mode of operation further comprises the step of ensuring that a packer is in a retracted position to permit hydrocarbons from the producing formation to flow from a lower zone of the well to an upper zone of the well.

6. The method of claim 2, wherein the step of placing the well in the first mode of operation further comprises the step of forcing the hydrocarbons from the producing formation to flow to the surface with an artificial lift system.

7. The method of claim 1, wherein the step of placing the well in the second mode of operation further comprises placing a sliding sleeve in an open position to permit communication of the pressurized fluids between the well and the underground gas storage formation through upper perforations.

8. he method of claim 7, wherein the step of placing the well in the second mode of operation further comprises placing a packer into a deployed position to prevent hydrocarbons from the gas storage unit from entering a lower zone of the well below the packer.

9. The method of claim 7, wherein the step of placing the well in the second mode of operation further comprises opening a gas isolation valve between the gas storage unit and the well.

10. The method of claim 1, wherein the steps of placing the well in the first mode of operation and placing the well in the second mode of operation are repeated until the underground gas storage formation contains a desired amount of gas.

11. The method of claim 1, further comprising the step of placing the well in a third mode of operation in which gases stored in the gas storage formation are permitted to enter the well from the gas storage formation through upper perforations.

12. The method of claim 11, wherein the step of placing the well in the third mode of operation comprises opening a sliding sleeve to permit gases from the gas storage formation to enter the well through the upper perforations.

13. The method of claim 12, wherein the step of placing the well in the third mode of operation further comprises placing a packer located below the upper perforations into a retracted position to permit hydrocarbons from the underground gas storage formation to enter a lower zone of the well.

14. The method of claim 13, wherein the step of placing the well in the third mode of operation further comprises using the gases discharged from the gas storage formation to activate a gas lift system in the lower zone of the well to encourage the removal of liquid hydrocarbons from the well.

15. The method of claim 13, wherein the step of placing the well in the third mode of operation further comprises using the gases discharged from the gas storage formation to provide an enhanced oil recovery (EOR) function to improve the production of hydrocarbons from the producing formation in the lower zone of the well.

16. The method of claim 15, wherein the steps of placing the well in the second and third modes of operation are repeated to optimize the enhanced oil recovery (EOR).

* * * * *